US012585098B2

(12) United States Patent
Yamazaki et al.

(10) Patent No.: US 12,585,098 B2
(45) Date of Patent: Mar. 24, 2026

(54) MICROSCOPE OBJECTIVE LENS

(71) Applicant: Changzhou AAC Raytech Optronics Co., Ltd., Changzhou City (CN)

(72) Inventors: Kaoru Yamazaki, Osaka (JP); Takashi Iwasaki, Osaka (JP)

(73) Assignee: Changzhou AAC Raytech Optronics Co., Ltd., Changzhou City (CN)

( * ) Notice: Subject to any disclaimer, the term of this patent is extended or adjusted under 35 U.S.C. 154(b) by 316 days.

(21) Appl. No.: 18/391,570

(22) Filed: Dec. 20, 2023

(65) Prior Publication Data

US 2024/0418975 A1　Dec. 19, 2024

(30) Foreign Application Priority Data

Jun. 19, 2023　(CN) .......................... 202310729717.9

(51) Int. Cl.
*G02B 21/02* (2006.01)
*G02B 9/64* (2006.01)

(52) U.S. Cl.
CPC .............. *G02B 21/02* (2013.01); *G02B 9/64* (2013.01)

(58) Field of Classification Search
CPC ........... G02B 21/02; G02B 9/64; G02B 13/00
See application file for complete search history.

(56) References Cited

U.S. PATENT DOCUMENTS

| | | | | |
|---|---|---|---|---|
| 6,501,603 B2 * | 12/2002 | Kasahara | ............... | G02B 21/02 |
| | | | | 359/659 |
| 2002/0005851 A1 * | 1/2002 | Kinno | .................. | G02B 27/646 |
| | | | | 345/426 |
| 2015/0241670 A1 * | 8/2015 | Amano | ................ | G03B 21/003 |
| | | | | 359/680 |
| 2016/0131879 A1 * | 5/2016 | Sugita | ............ | G02B 15/143105 |
| | | | | 359/686 |
| 2024/0427130 A1 * | 12/2024 | Guo | ........................ | G02B 13/00 |

* cited by examiner

*Primary Examiner* — Bumsuk Won
*Assistant Examiner* — John Curtis Sipes
(74) *Attorney, Agent, or Firm* — Wiersch Law Group

(57) ABSTRACT

Disclosed is a microscope objective lens including from an emitting side to an objective side: the first lens to the twelfth lens. The focal length of the microscope objective lens is f, the numerical aperture is NA, and the working distance is WD. A focal length of a lens group consisting of the first lens to the fourth lens is f1-4, and a combined focal length between the seventh lens and the eighth lens is f78. The on-axis distances of the seventh and the eighth lens are d13 and d15, and an on-axis distance from the seventh lens to the eighth lens is d14. The central radiuses of curvature of the emitting surface and the objective surface of the eleventh lens are R21 and R22, respectively. The following relationship expressions are satisfied: $0.09 \leq f1-4/f \leq 0.15$; $-1.35 \leq f78/(d13+d14+d15) \leq -0.95$; $-7.00 \leq R21/R22 \leq -2.00$; $0.20 \leq NA*f/WD \leq 0.26$. This microscope objective lens has excellent optical characteristics, and low aberration.

15 Claims, 9 Drawing Sheets

Axial Aberration

Magnification Chromatic Aberration

Axial Aberration

Millimeter

Magnification Chromatic Aberration

Micron

MICROSCOPE OBJECTIVE LENS

CROSS-REFERENCE TO RELATED APPLICATIONS

This application claims the priority of Chinese Patent Application No. 202310729717.9, entitled "MICROSCOPE OBJECTIVE LENS", filed with the China National Intellectual Property Administration on Jun. 19, 2023, which is incorporated herein by reference in its entirety.

TECHNICAL FIELD

The present application relates to the technical field of optical lenses, in particular to a microscope objective lens applicable in a device such as a microscope.

BACKGROUND

In recent years, there has been a growing demand for microscope lenses. However, conventional microscope lenses often exhibit distortions within their microscopic range due to optical structural constraints. Additionally, the length of microscope lenses is inevitably affected by the presence of multiple lenses, and elongated structures may result in a shorter working distance. The magnification is also influenced by the working distance, which may be inconvenient for operators.

With the advancement of technology and the increasing diversity of user demands, there is a growing need in scientific research for microscope lenses with improved observation quality. There is an urgent demand for microscope lenses that exhibit excellent optical characteristics, low distortion, and a long working distance.

SUMMARY

In response to the above problem, an object of the present application is to provide a microscope objective lens that has good optical performance while satisfying the design requirement of low aberration.

In order to solve the above technical problems, an embodiment of the present application provides a microscope objective lens, comprising in order from an emitting side to an objective side: a first lens having a positive refractive force; a second lens having a positive refractive force; a third lens having a negative refractive force; a fourth lens having a negative refractive force; a fifth lens having a positive refractive force; a sixth lens having a negative refractive force; a seventh lens having a negative refractive force; an eighth lens having a negative refractive force; a ninth lens having a positive refractive force; a tenth lens having a negative refractive force; an eleventh lens having a positive refractive force; and a twelfth lens having a positive refractive force; wherein a focal length of the microscope objective lens is f; a focal length of a lens group consisting of the ninth lens, the tenth lens, the eleventh lens, and the twelfth lens is f9-12; a combined focal length of the seventh lens and the eighth lens is f78; an on-axis thickness of the seventh lens is d13; an on-axis thickness of the eighth lens is d15; an on-axis distance from an objective surface of the seventh lens to an emitting surface of the eighth lens is d14; a central radius of curvature of an emitting surface of the eleventh lens is R21; a central radius of curvature of an objective surface of the eleventh lens is R22; a numerical aperture of the microscope objective lens is NA; a working distance of the microscope objective lens is WD, and the following relationship expressions are satisfied: $0.09 \leq f9\text{-}12/f \leq 0.15$; $-1.35 \leq f78/(d13+d14+d15) \leq -0.95$; $-7.00 \leq R21/R22 \leq -2.00$; $0.20 \leq NA*f/WD \leq 0.26$.

In one embodiment, a central radius of curvature of an emitting surface of the fifth lens is R9; a focal length of the fifth lens is f5, and the following relationship expression is satisfied: $0.90 \leq R9/f5 \leq 3.00$.

In one embodiment, an emitting surface of the first lens is convex at a proximal-axis position, and an objective surface of the first lens is convex at a proximal-axis position; a focal length of the first lens is f1; a central radius of curvature of the emitting surface of the first lens is R1; a central radius of curvature of the objective surface of the first lens is R2; an on-axis thickness of the first lens is d1; an optical total length of the microscope objective lens is TTL, and the following relationship expressions are satisfied: $0.08 \leq f1/f \leq 0.27$; $-1.83 \leq (R1+R2)/(R1-R2) \leq -0.56$; $0.01 \leq d1/TTL \leq 0.03$.

In one embodiment, an emitting surface of the second lens is convex at a proximal-axis position, and an objective surface of the second lens is convex at a proximal-axis position; a focal length of the second lens is f2; a central radius of curvature of the emitting surface of the second lens is R3; a central radius of curvature of the objective surface of the second lens is R4; an on-axis thickness of the second lens is d3; an optical total length of the microscope objective lens is TTL, and the following relationship expressions are satisfied: $0.09 \leq f2/f \leq 0.30$; $-1.09 \leq (R3+R4)/(R3-R4) \leq -0.02$; $0.01 \leq d3/TTL \leq 0.03$.

In one embodiment, an emitting surface of the third lens is concave at a proximal-axis position, and an objective surface of the third lens is concave at a proximal-axis position; a focal length of the third lens is f3; a central radius of curvature of the emitting surface of the third lens is R5; a central radius of curvature of the objective surface of the third lens is R6; an on-axis thickness of the third lens is d5; an optical total length of the microscope objective lens is TTL, and the following relationship expressions are satisfied: $-0.23 \leq f3/f \leq -0.07$; $-0.26 \leq (R5+R6)/(R5-R6) \leq 0.53$; $0.00 < d5/TTL \leq 0.01$.

In one embodiment, an objective surface of the fourth lens is concave at a proximal-axis position; a focal length of the fourth lens is f4; a central radius of curvature of an emitting surface of the fourth lens is R7; a central radius of curvature of the objective surface of the fourth lens is R8; an on-axis thickness of the third lens is d7; an optical total length of the microscope objective lens is TTL, and the following relationship expressions are satisfied: $-0.28 \leq f4/f \leq -0.05$; $0.09 \leq (R7+R8)/(R7-R8) \leq 4.94$; $0.00 < d7/TTL \leq 0.02$.

In one embodiment, an emitting surface of the fifth lens is convex at a proximal-axis position, and an objective surface of the fifth lens is convex at a proximal-axis position; a focal length of the fifth lens is f5; a central radius of curvature of the emitting surface of the fifth lens is R9; a central radius of curvature of the objective surface of the fifth lens is R10; an on-axis thickness of the fifth lens is d9; an optical total length of the microscope objective lens is TTL, and the following relationship expressions are satisfied: $0.03 \leq f5/f \leq 0.10$; $-0.65 \leq (R9+R10)/(R9-R10) \leq 0.89$; $0.01 \leq d9/TTL \leq 0.04$.

In one embodiment, an emitting surface of the sixth lens is concave at a proximal-axis position; a focal length of the sixth lens is f6; a central radius of curvature of the emitting surface of the sixth lens is R11; a central radius of curvature of an objective surface of the sixth lens is R12; an on-axis thickness of the sixth lens is d11; an optical total length of the microscope objective is TTL, and the following relationship expressions are satisfied: $-0.22 \leq f6/f \leq -0.04$; $-5.23 \leq$ (R11+R12)/(R11−R12)$\leq$−0.13; $0.00 < d11/TTL \leq 0.01$.

In one embodiment, the objective surface of the seventh lens is concave at a proximal-axis position; a focal length of the seventh lens is f7; a central radius of curvature of an emitting surface of the seventh lens is R13; a central radius of curvature of the objective surface of the seventh lens is R14; an on-axis thickness of the seventh lens is d13; an optical total length of the microscope objective lens is TTL, and the following relationship expressions are satisfied: $-1.04 \leq f7/f \leq -0.14$; $0.38 \leq$(R13+R14)/(R13−R14)$\leq 6.21$; $0.00 < d13/TTL \leq 0.02$.

In one embodiment, the emitting surface of the eighth lens is concave at a proximal-axis position, and an objective surface of the eighth lens is concave at a proximal-axis position; a focal length of the eighth lens is f8; a central radius of curvature of the emitting surface of the eighth lens is R15; a central radius of curvature of the objective surface of the eighth lens is R16; an on-axis thickness of the eighth lens is d15; an optical total length of the microscope objective lens is TTL, and the following relationship expressions are satisfied: $-0.27 \leq f8/f \leq -0.04$; $-1.72 \leq$(R15+R16)/(R15−R16)$\leq -0.52$; $0.00 < d15/TTL \leq 0.01$.

In one embodiment, an emitting surface of the ninth lens is convex at a proximal-axis position; a focal length of the ninth lens is f9; a central radius of curvature of the emitting surface of the ninth lens is R17; a central radius of curvature of an objective surface of the ninth lens is R18; an on-axis thickness of the ninth lens is d17; an optical total length of the microscope objective lens is TTL, and the following relationship expressions are satisfied: $0.10 \leq f9/f \leq 2.22$; $-22.38 \leq$(R17+R18)/(R17−R18)$\leq 0.75$; $0.01 \leq d17/TTL \leq 0.05$.

In one embodiment, an objective surface of the tenth lens is concave at a proximal-axis position; a focal length of the tenth lens is f10; a central radius of curvature of an emitting surface of the tenth lens is R19; a central radius of curvature of the objective surface of the tenth lens is R20; an on-axis thickness of the tenth lens is d19; an optical total length of the microscope objective lens is TTL, and the following relationship expressions are satisfied: $-0.90 \leq f10/f \leq -0.23$; $0.50 \leq$(R19+R20)/(R19−R20)$\leq 6.77$; $0.00 < d19/TTL \leq 0.01$.

In one embodiment, the emitting surface of the eleventh lens is convex at a proximal-axis position, and the objective surface of the eleventh lens is convex at a proximal-axis position; a focal length of the eleventh lens is f11; a central radius of curvature of the emitting surface of the eleventh lens is R21; a central radius of curvature of the objective surface of the eleventh lens is R22; an on-axis thickness of the eleventh lens is d21; an optical total length of the microscope objective lens is TTL, and the following relationship expressions are satisfied: $0.07 \leq f11/f \leq 0.24$; $0.17 \leq$(R21+R22)/(R21−R22)$\leq 1.12$; $0.03 \leq d21/TTL \leq 0.10$.

In one embodiment, an emitting surface of the twelfth lens is concave at a proximal-axis position, and an objective surface of the twelfth lens is convex at a proximal-axis position; a focal length of the twelfth lens is f12; a central radius of curvature of the emitting surface of the twelfth lens is R23; a central radius of curvature of the objective surface of the twelfth lens is R24, and the following relationship expressions are satisfied: $0.16 \leq f12/f \leq 0.63$; $0.59 \leq$(R23+R24)/(R23−R24)$\leq 3.06$; $0.01 \leq d23/TTL \leq 0.05$.

In one embodiment, the first lens, the second lens, the third lens, the fourth lens, the fifth lens, the sixth lens, the seventh lens, the eighth lens, the ninth lens, the tenth lens, the eleventh lens, and the twelfth lens are all made of glass materials.

The beneficial effect of the present application is that the microscope objective lens of the present application has excellent optical characteristics, and low aberration characteristics, and is particularly suitable for optical microscope objectives.

BRIEF DESCRIPTION OF THE DRAWINGS

In order to illustrate the technical solutions in the embodiments of the present application more clearly, the accompanying drawings to be used in the description of the embodiments will be briefly introduced below. Obviously, the accompanying drawings in the following description are only some embodiments of the present application, and for those of ordinary skill in the field, other accompanying drawings may be obtained based on these drawings without creative labor.

DETAILED DESCRIPTION OF THE EMBODIMENTS

In order to make the objects, technical solutions, and advantages of the present application clearer, various embodiments of the present application will be described in detail below in connection with the accompanying drawings. However, those of ordinary skill in the art can understand that in the various embodiments of the present application, a number of technical details have been proposed in order to enable the reader to better understand the present application, and even without these technical details and various variations and modifications based on the following various embodiments, the technical solution claimed to be protected by the present application can be realized.

First Embodiment

Figure 1:
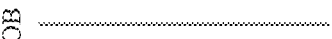
FIG. 1 is a structural schematic diagram of a microscope objective lens according to the first embodiment of the present application.
Figure 1:
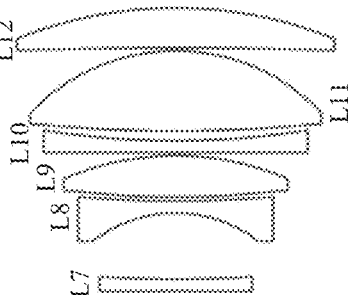
Figure 1:

As shown in the accompanying drawings, the present application provides a microscope objective lens 10. FIG. 1 shows a structural schematic diagram of a microscope objective lens 10 according to a first embodiment of the present application. The microscope objective lens 10 includes twelve lenses in order from an emitting side to an objective side. Specifically, the microscope objective lens 10, in order from the emitting side to the image side, includes a first lens L1, a second lens L2, a third lens L3, an aperture ST, a fourth lens L4, a fifth lens L5, a sixth lens L6, a seventh lens L7, an eighth lens L8, a ninth lens L9, a tenth lens L10, an eleventh lens L11, a twelfth lens L12 and an objective surface OB.

In this embodiment, the first lens L1 is made of glass material, the second lens L2 is made of glass material, the third lens L3 is made of glass material, the fourth lens L4 is made of glass material, the fifth lens L5 is made of glass material, the sixth lens L6 is made of glass material, the seventh lens L7 is made of glass material, the eighth lens L8 is made of glass material, the ninth lens L9 is made of glass material, the tenth lens L10 is made of glass material, the eleventh lens L11 is made of glass material, and the twelfth lens L12 is made of glass material.

In this embodiment, it is defined that the focal length of the microscope objective lens 10 is f, and a focal length of a lens group consisting of the ninth lens L9, the tenth lens L10, the eleventh lens L11, and the twelfth lens L12 is f9-12. The following relationship expression is satisfied: $0.09 \leq f9\text{-}12/f < 0.15$. Thus, a range of a ratio of the focal length of the lens group consisting of the ninth lens L9, the tenth lens L10, the eleventh lens L11, and the twelfth lens L12 at the objective side to the focal length of the system is specified, thereby ensuring that the incident light rays have a sufficient convergence capability.

It is defined that a combined focal length of the seventh lens L7 and the eighth lens L8 is f78, an on-axis thickness of the seventh lens L7 is d13, an on-axis thickness of the eighth lens L8 is d15, and an on-axis distance from an objective surface of the seventh lens L7 to an emitting surface of the eighth lens L8 is d14. The following relationship expression is satisfied: $-1.35 \leq f78/(d13+d14+d15) \leq -0.95$. Thus, a range of a ratio of the focal length and the thickness of the combined lens including the seventh lens L7 and the eighth lens L8 is specified, thereby ensuring sufficient curvature while maintaining a reasonable thickness conducive to correction of aberrations, $|Distortion| \leq 0.5\%$.

It is defined that a central radius of curvature of an emitting side of the eleventh lens L11 is R21, and a central radius of curvature of an objective surface of the eleventh lens L11 is R22. The following relationship expression is satisfied: $-7.00 \leq R21/R22 \leq -2.00$, in which a shape of the eleventh lens L11 is specified. Within the range of the relationship expression, a degree of bias of the light rays passing through the lens is moderated. The spherical aberration is effectively reduced and the chromatic aberration is corrected, in which the chromatic aberration is $|LC| \leq 2.4 \, \mu m$.

It is defined that the numerical aperture of the microscope objective lens 10 is NA, a working distance of the microscope objective lens 10 (an on-axis distance from an objective surface of the twelfth lens L12 to an objective surface OB) is WD, and a focal length of the microscope objective lens 10 is f. The following relationship expression is satisfied: $0.20 \leq NA*f/WD \leq 0.26$, and the conditions to be satisfied by the numerical aperture and resolution of the microscope objective lens 10 are specified. Within the above range, the microscope objective 10 has a relatively larger numerical aperture and greater resolution.

A central radius of curvature of an emitting surface of the fifth lens L5 is R9, and a focal length of the fifth lens L5 is f5. The following relationship expression is satisfied: $0.90 \leq R9/f5 \leq 3.00$. Through the reasonable distribution of the focal length of the lenses and the control of the shape of the light emitting surface, it is conducive to the smooth transition of the light between the groups of lenses, and the correction of aberration to achieve a high resolution. Besides, it can reduce tolerance sensitivity issues such as tilt/deviation of the lens during the assembly process.

In this embodiment, an emitting surface of the first lens L1 is convex at a proximal-axis position, an objective surface of the first lens L1 is convex at a proximal-axis position, and the first lens L1 has a positive refractive force.

It is defined that the focal length of the microscope objective lens 10 is f, and a focal length of the first lens is f1. The following relationship expression is satisfied: $0.08 \leq f1/f \leq 0.27$, in which the positive refractive force of the first lens L1 is specified, which is conducive to reasonably controlling the total optical length of the microscope objective lens 10. In an embodiment, $0.12 \leq f1/f \leq 0.21$ is satisfied.

It is defined that a central radius of curvature of the emitting surface of the first lens L1 is R1, and a central radius of curvature of the objective surface of the first lens L1 is R2. The following relationship expression is satisfied: $-1.83 \leq (R1+R2)/(R1-R2) \leq -0.56$, in which the shape of the first lens L1 is reasonably controlled, so that the first lens L1 is able to correct the systematic spherical aberration effectively. In an embodiment, $-1.14 \leq (R3+R4)/(R3-R4) < -0.70$ is satisfied.

It is defined that an on-axis thickness of the first lens L1 is d1, and an optical total length of the microscope objective lens 10 is TTL. The following relationship expression is satisfied: $0.01 \leq d1/TTL \leq 0.03$, which is conducive to reasonably controlling the optical total length of the microscope objective lens 10.

In this embodiment, an emitting surface of the second lens L2 is convex at a proximal-axis position, an objective surface of the second lens L2 is convex at a proximal-axis position, and the second lens L2 has a positive refractive force.

It is defined that the focal length of the microscope objective lens 10 is f, and a focal length of the second lens L2 is f2. The following relationship expression is satisfied: $0.09 \leq f2/f \leq 0.30$. By controlling the positive optical focus of the second lens L2 in a reasonable range, it is conducive to correcting the aberration of the optical system. In an embodiment, $0.14 \leq f2/f \leq 0.24$ is satisfied.

It is defined that a central radius of curvature of the emitting surface of the second lens L2 is R3, and a central radius of curvature of the objective surface of the second lens L2 is R4. The following relationship expression is satisfied: $-1.09 \leq (R3+R4)/(R3-R4) < -0.02$, in which the shape of the second lens L2 is specified, which is conducive to the correction of the problem of on-axis chromatic aberration when it is within the above range. In an embodiment, $-0.68 \leq (R3+R4)/(R3-R4) \leq -0.03$ is satisfied.

An on-axis thickness of the second lens L2 is d3, and the optical total length of the microscope objective lens 10 is TTL. The following relationship expression is satisfied: $0.01 \leq d3/TTL \leq 0.03$, which is conducive to reasonably controlling the optical total length of the microscope objective lens 10. In an embodiment, $0.01 \leq d3/TTL \leq 0.02$ is satisfied.

In this embodiment, an emitting surface of the third lens L3 is concave at a proximal-axis position, an objective surface is concave at a proximal-axis position, and the third lens L3 has a negative refractive force.

It is defined that the focal length of the microscope objective lens 10 is f, and a focal length of the third lens L3 is f3. The following relationship expression is satisfied: $-0.23 \leq f3/f < -0.07$. Through the reasonable distribution of the optical focal length, the system is made to have better imaging quality and lower sensitivity. In an embodiment, $-0.14 \leq f3/f \leq -0.09$ is satisfied.

A central radius of curvature of the emitting surface of the third lens L3 is R5, and a central radius of curvature of the objective surface of the third lens L3 is R6. The following relationship expression is satisfied: $-0.26 \leq (R5+R6)/(R5-R6) \leq 0.53$, in which the shape of the third lens L3 can be effectively controlled, which is conducive to the shaping of the third lens L3 and avoids the poor shaping caused by the excessive surface curvature of the third lens L3 and stress generation. In an embodiment, $-0.16 \leq (R5+R6)/(R5-R6) \leq 0.42$ is satisfied.

It is defined that the on-axis thickness of the third lens L3 is d5, and the optical total length of the microscope objective lens 10 is TTL. The following relationship expression is satisfied: $0.00 < d5/TTL \leq 0.01$. Within the range of the above relationship expression, it is conducive to reasonably controlling the optical total length of the microscope objective lens 10.

In this embodiment, an emitting surface of the fourth lens L4 is convex at a proximal-axis position, an objective surface of the fourth lens L4 is concave at a proximal-axis position, and the fourth lens L4 has a negative refractive force. In other embodiments, the emitting surface and the objective surface of the fourth lens L4 may also be set to other concave and convex distributions.

It is defined that the focal length of the microscope objective 10 is f, and the focal length of the fourth lens L4 is f4. The following relationship expression is satisfied: $-0.28 \leq f4/f \leq -0.05$, so the system is made to have better imaging quality and lower sensitivity through the reasonable distribution of optical focal length. In an embodiment, $-0.18 \leq f4/f \leq -0.07$ is satisfied.

It is defined that a central radius of curvature of the emitting side of the fourth lens L4 is R7, and the central radius of curvature of the objective surface of the fourth lens L4 is R8. The following relationship expression is satisfied: $0.09 \leq (R7+R8)/(R7-R8) \leq 4.94$, in which the shape of the fourth lens L4 is specified. Within the above range, it is beneficial to the correction of the aberration of the off-axis drawing angle and other problems with the development of miniaturization. In an embodiment, $0.14 \leq (R7+R8)/(R7-R8) \leq 3.95$ is satisfied.

An on-axis thickness of the fourth lens L4 is d7, and the optical total length of the microscope objective lens 10 is TTL. The following relationship expression is satisfied: $0.00 < d7/TTL \leq 0.02$. Within the range of the relationship expression, it is conducive to reasonably controlling the optical total length of the microscope objective lens 10. In an embodiment, $d7/TTL=0.01$ is satisfied.

In this embodiment, an emitting surface of the fifth lens L5 is convex at a proximal-axis position, an objective surface of the fifth lens L5 is convex at a proximal-axis position, and the fifth lens L5 has a positive refractive force.

It is defined that the focal length of the microscope objective lens 10 is f, and a focal length of the fifth lens L5 is f5. The following relationship expression is satisfied: $0.03 \leq f5/f \leq 0.10$, and the limitation of the fifth lens L5 can effectively make the angle of light of the microscope objective lens 10 smooth and reduce the tolerance sensitivity. In an embodiment, $0.04 \leq f5/f \leq 0.08$ is satisfied.

A central radius of curvature of the emitting surface of the fifth lens L5 is R9, and a central radius of curvature of the objective surface of the fifth lens L5 is R10. The following relationship expression is satisfied: $-0.65 \leq (R9+R10)/(R9-R10) \leq 0.89$, in which the shape of the fifth lens L5 is specified, which is conducive to compensating for the aberration of the image of the off-axis drawing angle within the range of the above relationship expression. In an embodiment, $-0.41 \leq (R9+R10)/(R9-R10) \leq 0.71$ is satisfied.

An on-axis thickness of the fifth lens L5 is d9, and the optical total length of the microscope objective lens 10 is TTL. The following relationship expression is satisfied: $0.01 \leq d9/TTL \leq 0.04$. Within the range of the relationship expression, it is conducive to reasonably controlling the optical total length of the microscope objective lens 10. In an embodiment, $0.02 \leq d9/TTL \leq 0.03$ is satisfied.

In this embodiment, an emitting surface of the sixth lens L6 is concave at a proximal-axis position, an objective surface is concave at a proximal-axis position, and the sixth lens L6 has a negative refractive force. In other embodiments, the emitting surface and the objective surface of the sixth lens L6 may also be set to other concave and convex distributions.

It is defined that the focal length of the microscope objective lens 10 is f, and a focal length of the sixth lens L6 is f6. The following relationship expression is satisfied: $-0.22 \leq f6/f \leq -0.04$. The system is made to have better imaging quality and lower sensitivity through the reasonable distribution of optical focal length. In an embodiment, $-0.14 \leq f6/f \leq -0.04$ is satisfied.

A central radius of curvature of the emitting surface of the sixth lens L6 is R11, and a central radius of curvature of the objective surface of the sixth lens L6 is R12. The following relationship expression is satisfied: $-5.23 \leq (R11+R12)/(R11-R12) \leq -0.13$, in which the shape of the sixth lens L6 is specified, which is conducive to the correction of the aberration of the off-axis drawing angle and other problems within the range of the following relationship. In an embodiment, $-3.27 \leq (R11+R12)/(R11-R12) \leq -0.16$ is satisfied.

It is defined that an on-axis thickness of the sixth lens L6 is d11, and an optical total length of the microscope objective lens 10 is TTL. The following relationship expression is satisfied: $0.00 < d11/TTL \leq 0.01$. Within the range of the relationship expression, it is conducive to reasonably controlling the optical total length of the microscope objective lens 10. In an embodiment, $d11/TTL=0.01$ is satisfied.

In this embodiment, an emitting surface of the seventh lens L7 is concave at a proximal-axis position, an objective surface of the seventh lens L7 is concave at a proximal-axis position, and the seventh lens L7 has a negative refractive force. In other embodiments, the emitting surface and the objective surface of the seventh lens L7 may also be set to other concave and convex distributions.

It is defined that the focal length of the microscope objective 10 is f, and a focal length of the seventh lens L7 is f7. The following relationship expression is satisfied: $-1.04 \leq f7/f \leq -0.14$. The system is made to have better imaging quality and lower sensitivity through the reasonable distribution of optical focal length. In an embodiment, $-0.65 \leq f7/f \leq -0.18$ is satisfied.

A central radius of curvature of the emitting side of the seventh lens L7 is R13, and a central radius of curvature of the objective surface of the seventh lens L7 is R14. The following relationship expression is satisfied: $0.38 \leq (R13+R14)/(R13-R14) \leq 6.21$, in which the shape of the seventh lens L7 is specified. Within the range of the relationship expression, it is conducive to the correction of the aberration of the off-axis drawing angle and other problems with the development of miniaturization. In an embodiment, $0.60 \leq (R13+R14)/(R13-R14) \leq 4.97$ is satisfied.

An on-axis thickness of the seventh lens L7 is d13, and an optical total length of the microscope objective lens 10 is TTL. The following relationship expression is satisfied: $0.00 < d13/TTL \le 0.02$. Within the range of the relationship expression, it is conducive to reasonably controlling the optical total length of the microscope objective lens 10. In an embodiment, $d13/TTL = 0.01$ is satisfied.

In this embodiment, an emitting surface of the eighth lens L8 is concave at a proximal-axis position, an objective surface of the eighth lens L8 is concave at a proximal-axis position, and the eighth lens L8 has a negative refractive force.

It is defined that the focal length of the microscope objective lens 10 is f, and a focal length of the eighth lens L8 is f8. The following relationship expression is satisfied: $-0.27 \le f8/f < -0.04$. The system is made to have better imaging quality and lower sensitivity through the reasonable distribution of optical focal length. In an embodiment, $-0.17 \le f8/f \le -0.05$ is satisfied.

A central radius of curvature of the emitting surface of the eighth lens L8 is R15, and a central radius of curvature of the objective surface of the eighth lens L8 is R16. The following relationship expression is satisfied: $-1.72 \le (R15+R16)/(R15-R16) \le -0.52$, in which the shape of the eighth lens is specified. Within the range of the relationship expression, it is conducive to the correction of the aberration of the off-axis drawing angle and other problems with the development of miniaturization. In an embodiment, $-1.08 \le (R15+R16)/(R15-R16) \le -0.65$ is satisfied.

An on-axis thickness of the eighth lens L8 is d15, and the optical total length of the microscope objective lens 10 is TTL. The following relationship expression is satisfied: $0.00 < d15/TTL \le 0.01$. Within the range of the relationship expression, it is conducive to controlling the optical total length of the microscope objective lens 10.

In this embodiment, an emitting surface of the ninth lens L9 is convex at a proximal-axis position, an objective surface of the ninth lens L9 is convex at a proximal-axis position, and the ninth lens L9 has a positive refractive force. In other embodiments, the emitting surface and the objective surface of the ninth lens L9 may also be set to other concave and convex distributions.

It is defined that the focal length of the microscope objective lens 10 is f, and a focal length of the ninth lens L9 is f9. The following relationship expression is satisfied: $0.10 \le f9/f \le 2.22$. The system is made to have better imaging quality and lower sensitivity through the reasonable distribution of optical focal length. In an embodiment, $0.17 \le f9/f \le 1.78$ is satisfied.

A central radius of curvature of the emitting surface of the ninth lens L9 is R17, and a central radius of curvature of the objective surface of the ninth lens L9 is R18. The following relationship expression is satisfied: $-22.38 \le (R17+R18)/(R17-R18) \le 0.75$, in which the shape of the ninth lens is specified. Within the range of the relationship expression, it is conducive to the correction of the aberration of the off-axis drawing angle and other problems with the development of miniaturization. In an embodiment, $-13.99 \le (R17+R18)/(R17-R18) \le 0.60$ is satisfied.

An on-axis thickness of the ninth lens L9 is d17, and the optical total length of the microscope objective lens 10 is TTL. The following relationship expression is satisfied: $0.01 \le d17/TTL \le 0.05$, Within the range of the relationship expression, it is conducive to controlling the optical total length of the microscope objective lens 10. In an embodiment, $0.01 \le d17/TTL \le 0.04$ is satisfied.

In this embodiment, an emitting surface of the tenth lens L10 is concave at a proximal-axis position, an objective surface of the tenth lens L10 is concave at a proximal-axis position, and the tenth lens L10 has a negative refractive force. In other embodiments, the emitting surface and the objective surface of the tenth lens L10 may also be set to other concave and convex distributions.

It is defined that the focal length of the microscope objective lens 10 is f, and a focal length of the tenth lens L10 is f10. The following relationship expression is satisfied: $-0.90 \le f10/f \le -0.23$. The system is made to have a better imaging quality and a lower sensitivity through the reasonable distribution of the optical focal length. In an embodiment, $-0.56 \le f10/f \le -0.29$ is satisfied.

A central radius of curvature of the emitting surface of the tenth lens L10 is R19, and a central radius of curvature of the objective surface of the tenth lens L10 is R20. The following relationship expression is satisfied: $0.50 \le (R19+R20)/(R19-R20) \le 6.77$, in which the shape of the tenth lens is specified. Within the range of the relationship expression, it is conducive to the correction of the aberration of the off-axis drawing angle and other problems with the development miniaturization. In an embodiment, $0.80 \le (R19+R20)/(R19-R20) \le 5.42$ is satisfied.

An on-axis thickness of the tenth lens L10 is d19, and an optical total length of the microscope objective lens 10 is TTL. The following relationship expression is satisfied: $0.00 < d19/TTL \le 0.01$. Within the range of the relationship expression, it is conducive to reasonably controlling the optical total length of the microscope objective lens 10.

In this embodiment, an emitting surface of the eleventh lens L11 is convex at a proximal-axis position, an objective surface of the eleventh lens L11 is convex at a proximal-axis position, and the eleventh lens L11 has a positive refractive force.

It is defined that the focal length of the microscope objective lens 10 is f, and the focal length of the eleventh lens L11 is f11. The following relationship expression is satisfied: $0.07 \le f11/f \le 0.24$. The system is made to have a better imaging quality and lower sensitivity by a reasonable distribution of optical focal length. In an embodiment, $0.12 \le f11/f \le 0.19$ is satisfied.

A central radius of curvature of the emitting surface of the eleventh lens L11 is R21, and a central radius of curvature of the objective surface of the eleventh lens L11 is R22. The following relationship expression is satisfied: $0.17 \le (R21+R22)/(R21-R22) \le 1.12$, in which the shape of the tenth lens is specified. Within the range of the relationship expression, it is conducive to the correction of the aberration of the off-axis drawing angle and other problems with the development of miniaturization. In an embodiment, $0.27 \le (R21+R22)/(R21-R22) \le 0.90$ is satisfied.

An on-axis thickness of the eleventh lens L11 is d21, and an optical total length of the microscope objective lens 10 is TTL. The following relationship expression is satisfied: $0.03 \le d21/TTL \le 0.10$. Within the range of the relationship expression, it is conducive to reasonably controlling the optical total length of the microscope objective lens 10. In an embodiment, $0.05 \le d21/TTL \le 0.08$ is satisfied.

In this embodiment, an emitting surface of the twelfth lens L12 is concave at a proximal-axis position, the objective surface of the twelfth lens L12 is convex at a proximal-axis position, and the twelfth lens L12 has a positive refractive force.

It is defined that the focal length of the microscope objective lens 10 is f, and a focal length of the twelfth lens L12 is f12. The following relationship expression is satisfied: $0.16 \leq f12/f < 0.63$. The system is made to have better imaging quality and lower sensitivity through the reasonable distribution of optical focal length. In an embodiment, $0.25 \leq f12/f \leq 0.50$ is satisfied.

A central radius of curvature of the emitting side of the twelfth lens L12 is R23, and a central radius of curvature of the objective surface of the twelfth lens L12 is R24. The following relationship expression is satisfied: $0.59 \leq (R23+R24)/(R23-R24) \leq 3.06$, in which the shape of the tenth lens is specified. Within the range of the relationship expression, it is conducive to the correction of the aberration of the off-axis drawing angle and other problems with the development of miniaturization. In an embodiment, $0.95 \leq (R23+R24)/(R23-R24) \leq 2.44$ is satisfied.

An on-axis thickness of the twelfth lens L12 is d23, and the optical total length of the microscope objective lens 10

The microscope objective lens 10 of the present application will be illustrated below with examples. The symbols recorded in each example are shown below. The units of focal length, on-axis distance, central radius of curvature, and on-axis thickness are mm.

TTL: total optical length (on-axis distance from the emitting surface of the first lens L1 to the objective surface OB) in mm;

WD: working distance (on-axis distance from the objective surface of the twelfth lens L12 to the objective surface OB).

Tables 1 and 2 show design data of the microscope objective lens 10 according to the first embodiment of the present application.

TABLE 1

| | | R | d | | Refractive Index | Abbe number |
| | | | IMA | INF | (nd) | (vd) |
| --- | --- | --- | --- | --- | --- | --- |
| G1 | R1 | 16.408 | d1 | 1.904 n1 | 1.4970 v1 | 81.605 |
| | R2 | −185.888 | d2 | 0.250 | | |
| G2 | R3 | 31.455 | d3 | 1.616 n2 | 1.4970 v2 | 81.605 |
| | R4 | −45.872 | d4 | 0.724 | | |
| G3 | R5 | −37.557 | d5 | 1.000 n3 | 1.8160 v3 | 46.549 |
| | R6 | 32.202 | d6 | 2.141 | | |
| ST | | Infinity | dST-4 | 16.071 | | |
| G4 | R7 | 18.060 | d7 | 1.000 n4 | 1.8160 v4 | 46.549 |
| | R8 | 9.643 | d8 | 0.413 | | |
| G5 | R9 | 9.078 | d9 | 2.282 n5 | 1.6201 v5 | 36.431 |
| | R10 | −17.885 | d10 | 0.577 | | |
| G6 | R11 | −14.166 | d11 | 1.000 n6 | 1.8160 v6 | 46.549 |
| | R12 | 21.012 | d12 | 28.541 | | |
| G7 | R13 | −653.789 | d13 | 1.000 n7 | 1.8160 v7 | 46.549 |
| | R14 | 91.813 | d14 | 5.531 | | |
| G8 | R15 | −10.968 | d15 | 1.000 n8 | 1.8160 v8 | 46.549 |
| | R16 | 89.430 | d16 | 0.331 | | |
| G9 | R17 | 69.125 | d17 | 3.458 n9 | 1.4378 v9 | 94.523 |
| | R18 | −22.961 | d18 | 0.250 | | |
| G10 | R19 | −34854.075 | d19 | 1.000 n10 | 1.8160 v10 | 46.549 |
| | R20 | 68.065 | d20 | 0.811 | | |
| G11 | R21 | 114.563 | d21 | 6.687 n11 | 1.5046 v11 | 64.721 |
| | R22 | −16.448 | d22 | 0.250 | | |
| G12 | R23 | −400.000 | d23 | 3.349 n12 | 1.6201 v12 | 36.431 |
| | R24 | −34.457 | d24 | 21.000 | | | is TTL. The following relationship expression is satisfied: $0.01 \leq d23/TTL \leq 0.05$. Within the range of the relationship expression, it is conducive to reasonably controlling the optical total length of the microscope objective lens 10. In an embodiment, $0.02 \leq d23/TTL \leq 0.04$ is satisfied.

In this embodiment, the first lens L1, the second lens L2, the third lens L3, the fourth lens L4, the fifth lens L5, the sixth lens L6, the seventh lens L7, the eighth lens L8, the ninth lens L9, the tenth lens L10, the eleventh lens L11, and the twelfth lens L12 are all made of glass materials.

The microscope objective lens 10 has good optical performance while being able to meet the requirements of a miniaturized, low-aberration design. According to the characteristics of the microscope objective lens 10, the microscope objective lens 10 is particularly suitable for microscope objective lenses including high pixels.

When using the microscope objective lens 10, light from an objective is incident on the microscope objective lens 10 from the objective surface OB and exits the microscope objective lens 10 from the left side as parallel light. The optical design is in the opposite direction of the optical design, where the parallel light is incident from the left side and then focuses on the right side (objective surface OB) to be imaged.

The meaning of each symbol is as follows.

ST: aperture;

Gn: nth lens;

R: central radius of curvature of the optical surface;

R1: central radius of curvature of the emitting surface of the first lens L1;

R2: central radius of curvature of the objective surface of the first lens L1;

R3: central radius of curvature of the emitting surface of the second lens L2;

R4: central radius of curvature of the objective surface of the second lens L2;

R5: central radius of curvature of the emitting surface of the third lens L3;

R6: central radius of curvature of the objective surface of the third lens L3;

R7: central radius of curvature of the emitting surface of the fourth lens L4;

R8: central radius of curvature of the objective surface of the fourth lens L4;

R9: central radius of curvature of the emitting surface of the fifth lens L5;

R10: central radius of curvature of the objective surface of the fifth lens L5;

R11: central radius of curvature of the emitting surface of the sixth lens L6;

R12: central radius of curvature of the objective surface of the sixth lens L6;

R13: central radius of curvature of the emitting surface of the seventh lens L7;

R14: central radius of curvature of the objective surface of the seventh lens L7;

R15: central radius of curvature of the emitting surface of the eighth lens L8;

R16: central radius of curvature of the objective surface of the eighth lens L8;

R17: central radius of curvature of the emitting surface of the ninth lens L9

R18: central radius of curvature of the objective surface of the ninth lens L9;

R19: central radius of curvature of the emitting surface of the tenth lens L10

R20: central radius of curvature of the objective surface of the tenth lens L10;

R21: central radius of curvature of the emitting surface of the eleventh lens L11

R22: central radius of curvature of the objective surface of the eleventh lens L11;

R23: central radius of curvature of the emitting surface of the twelfth lens L12;

R24: central radius of curvature of the objective surface of the twelfth lens L12;

d: on-axis thickness of the lens, on-axis distance between the lenses;

d1: on-axis thickness of the first lens L1;

d2: on-axis distance from the objective surface of the first lens L1 to the emitting surface of the second lens L2;

d3: on-axis thickness of the second lens L2;

d4: on-axis distance from the objective surface of the second lens L2 to the emitting surface of the third lens L3;

d5: the on-axis thickness of the third lens L3;

d6: on-axis distance from the objective surface of the third lens L3 to the emitting surface of the aperture ST;

dST-4: on-axis distance from the objective surface of the aperture ST to the emitting surface of the fourth lens L4;

d7: on-axis thickness of the fourth lens L4;

d8: on-axis distance from the objective surface of the fourth lens L4 to the emitting surface of the fifth lens L5;

d9: on-axis thickness of the fifth lens L5;

d10: on-axis distance from the objective surface of the fifth lens L5 to the emitting surface of the sixth lens L6;

d11: on-axis thickness of the sixth lens L6;

d12: on-axis distance from the objective surface of the sixth lens L6 to the emitting surface of the seventh lens L7;

d13: on-axis thickness of the seventh lens L7;

d14: on-axis distance from the objective surface of the seventh lens L7 to the emitting surface of the eighth lens L8;

d15: on-axis thickness of the eighth lens L8;

d16: on-axis distance from the objective surface of the eighth lens L8 to the emitting surface of the ninth lens L9;

d17: on-axis thickness of the ninth lens L9;

d18: on-axis distance from the objective surface of the ninth lens L9 to the emitting surface of the tenth lens L10;

d19: on-axis thickness of the tenth lens L10;

d20: on-axis distance from the objective surface of the tenth lens L10 to the emitting surface of the eleventh lens L11;

d21: on-axis thickness of the eleventh lens L11;

d22: on-axis distance from the objective surface of the eleventh lens L11 to the emitting surface of the twelfth lens L12;

d23: on-axis thickness of the twelfth lens L12;

d24: on-axis distance from the objective surface of the twelfth lens L12 to the objective surface OB;

nd: refractive index of line d;

nd1: refractive index of the line d of the first lens L1;

nd2: refractive index of the line d of the second lens L2;

nd3: refractive index of the line d of the third lens L3;

nd4: the refractive index of the line d of the fourth lens L4;

nd5: the refractive index of the line d of the fifth lens L5;

nd6: refractive index of the line d of the sixth lens L6;

nd7: refractive index of the line d of the seventh lens L7;

nd8: refractive index of the line d of the eighth lens L8;

nd9: refractive index of the line d of the ninth lens L9;

nd10: refractive index of the line d of the tenth lens L10;

nd11: refractive index of the line d of the eleventh lens L11;

nd12: refractive index of the line d of the twelfth lens L12;

vd: Abbe number;

v1: Abbe number of the first lens L1;

v2: Abbe number of the second lens L2;

v3: Abbe number of the third lens L3;

v4: Abbe number of the fourth lens L4;

v5: Abbe number of the fifth lens L5;

v6: Abbe number of the sixth lens L6;

v7: Abbe number of the seventh lens L7;

v8: Abbe number of the eighth lens L8;

v9: Abbe number of the ninth lens L9;

v10: Abbe number of the tenth lens L10;

v11: Abbe number of the eleventh lens L11;

v12: Abbe number of the twelfth lens L12.

Figure 2:
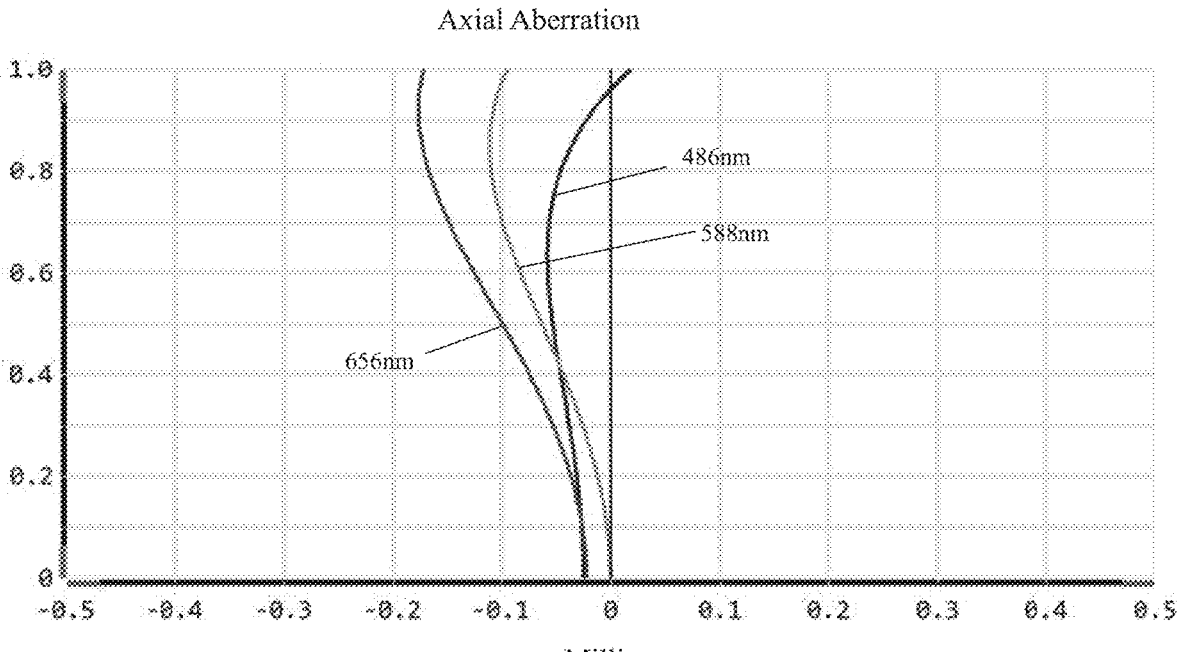
FIG. 2 is a schematic diagram showing the axial aberration of the microscope objective lens shown in FIG. 1.
Figure 3:
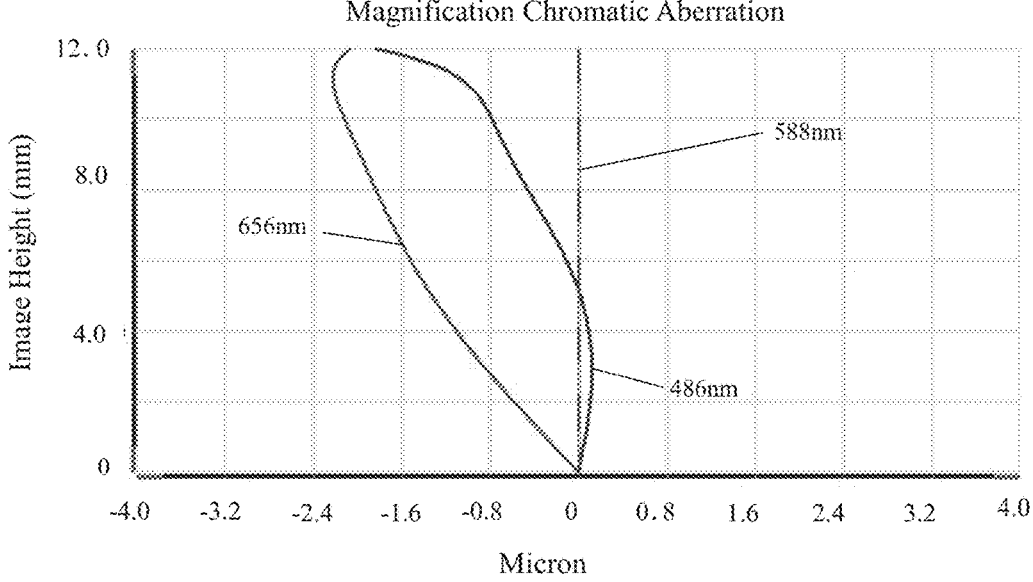
FIG. 3 is a schematic diagram showing the magnification chromatic aberration of the microscope objective lens shown in FIG. 1.
Figure 4:
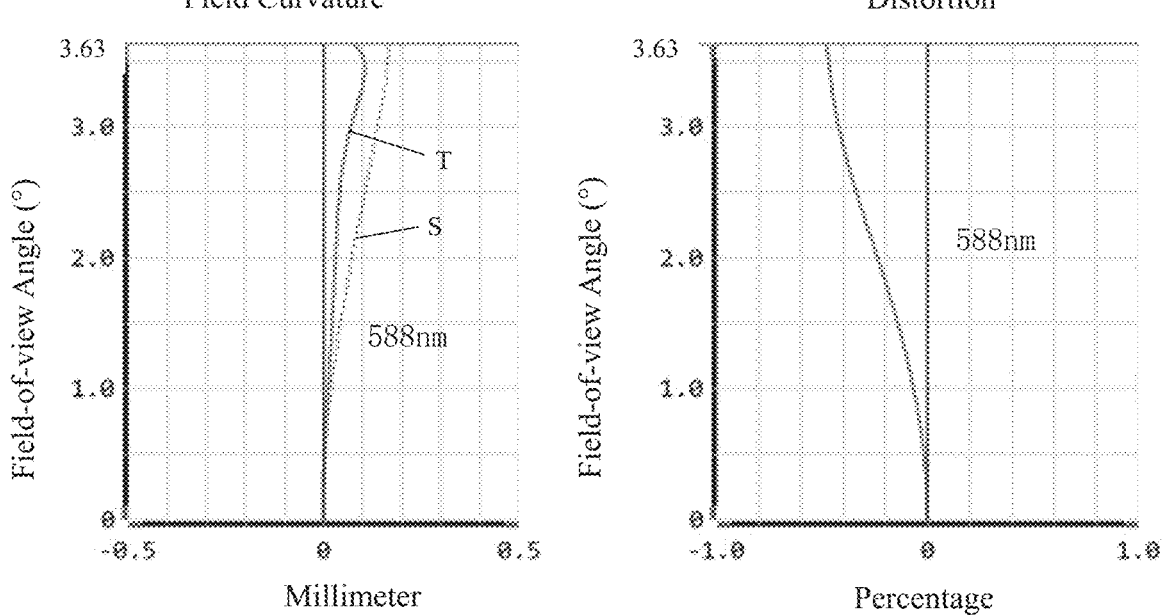
FIG. 4 is a schematic diagram showing field curvature and distortion of the microscope objective lens shown in FIG. 1.

FIGS. 2 and 3 are schematic diagrams showing axial aberration and magnification chromatic aberration of light with wavelengths of 656 nm, 588 nm, and 486 nm, respectively, after passing through the microscope objective lens 10 of the first embodiment. FIG. 4 shows a schematic diagram showing the field curvature and distortion of light with a wavelength of 588 nm after passing through the microscope objective lens 10 of the first embodiment. The field curvature S of FIG. 4 is the field curvature in the arc-sagittal direction, and the field curvature T is the field curvature in the meridional direction.

Table 4 in the following shows the values corresponding to various values in the first, second, and third embodiments of each embodiment and the parameters that have been specified in the relationship expressions.

As shown in Table 4, the first embodiment satisfies each of the relationship expressions.

In this embodiment, an Entrance Pupil Diameter (ENPD) of the microscope objective 10 is 8.508 mm, a full field-of-view image height (IH) is 12.000 mm, a numerical aperture (NA) is 0.022 mm, and a diagonally oriented field-of-view angle (FOV) is 7.26°. The microscope objective 10 satisfies the design requirements of low aberrations and has excellent optical characteristics due to its on-axis and off-axis chromatic aberrations being sufficiently compensated.

Second Embodiment

The second embodiment is essentially the same as the first embodiment, the meaning of the symbols is the same as that of the first embodiment, and only the differences are listed below.

In this embodiment, the emitting surface of the fourth lens L4 is concave at the proximal-axis position. The objective surface of the sixth lens L6 is convex at the proximal-axis position. The emitting surface of the seventh lens L7 is convex at the proximal-axis position. The objective surface of the ninth lens L9 is concave at the proximal-axis position, and the emitting surface of the tenth lens L10 is convex at the proximal-axis position.

Figure 5:
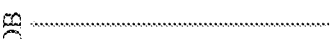
FIG. 5 is a structural schematic diagram of the microscope objective lens according to the second embodiment of the present application.
Figure 5:
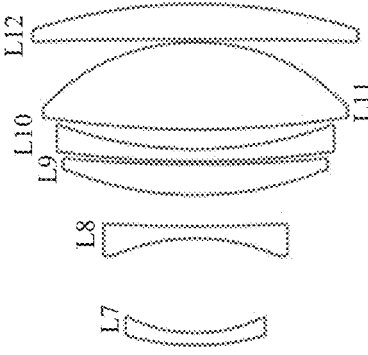
Figure 5:
Figure 5:
Figure 5:

FIG. 5 is a structural schematic diagram of the microscope objective lens 20 according to the second embodiment of the present application.

Table 2 illustrates the design data of the microscope objective lens 20 of the second embodiment of the present application.

As shown in Table 4, the second embodiment satisfies each of the relationship expressions.

In this embodiment, an ENPD of the microscope objective 20 is 9.780 mm, a full field-of-view image height (IH) is 12.000 mm, a numerical aperture (NA) is 0.025 mm, and a field-of-view angle (FOV) in the diagonal direction is 7.26°. The microscope objective 20 satisfies the design requirements of low aberrations and has excellent optical characteristics due to its on-axis and off-axis chromatic aberrations being sufficiently compensated.

Third Embodiment

The third embodiment is essentially the same as the first embodiment, the meaning of the symbols is the same as that of the first embodiment, and only the differences are listed below.

In this embodiment, the emitting surface of the fourth lens L4 is concave at the proximal-axis position. The objective surface of the sixth lens L6 is convex at the proximal-axis position. The emitting surface of the seventh lens L7 is

TABLE 2

| | | R | IMA | d INF | Refractive Index (nd) | | Abbe number (vd) |
|---|---|---|---|---|---|---|---|
| G1 | R1 | 15.579 | d1 | 2.175 | n1 | 1.4970 v1 | 81.605 |
| | R2 | −255.110 | d2 | 0.250 | | | |
| G2 | R3 | 34.675 | d3 | 1.788 | n2 | 1.4970 v2 | 81.605 |
| | R4 | −37.361 | d4 | 0.801 | | | |
| G3 | R5 | −31.214 | d5 | 1.000 | n3 | 1.8160 v3 | 46.549 |
| | R6 | 40.589 | d6 | 1.868 | | | |
| ST | | Infinity | dST-4 | 14.943 | | | |
| G4 | R7 | −41.147 | d7 | 1.000 | n4 | 1.8160 v4 | 46.549 |
| | R8 | 18.330 | d8 | 0.529 | | | |
| G5 | R9 | 20.663 | d9 | 2.430 | n5 | 1.6201 v5 | 36.431 |
| | R10 | −9.202 | d10 | 0.540 | | | |
| G6 | R11 | −8.510 | d11 | 1.000 | n6 | 1.8160 v6 | 46.549 |
| | R12 | −20.929 | d12 | 24.793 | | | |
| G7 | R13 | 19.820 | d13 | 1.000 | n7 | 1.8160 v7 | 46.549 |
| | R14 | 12.108 | d14 | 7.735 | | | |
| G8 | R15 | −16.461 | d15 | 1.000 | n8 | 1.8160 v8 | 46.549 |
| | R16 | 147.480 | d16 | 2.548 | | | |
| G9 | R17 | 27.444 | d17 | 2.509 | n9 | 1.4378 v9 | 94.523 |
| | R18 | 111.858 | d18 | 0.250 | | | |
| G10 | R19 | 77.849 | d19 | 1.000 | n10 | 1.8160 v10 | 46.549 |
| | R20 | 31.795 | d20 | 1.619 | | | |
| G11 | R21 | 76.185 | d21 | 7.139 | n11 | 1.5046 v11 | 64.721 |
| | R22 | −16.930 | d22 | 0.250 | | | |
| G12 | R23 | −400.000 | d23 | 2.871 | n12 | 1.6201 v12 | 36.431 |
| | R24 | −42.150 | d24 | 21.000 | | | |

Figure 6:
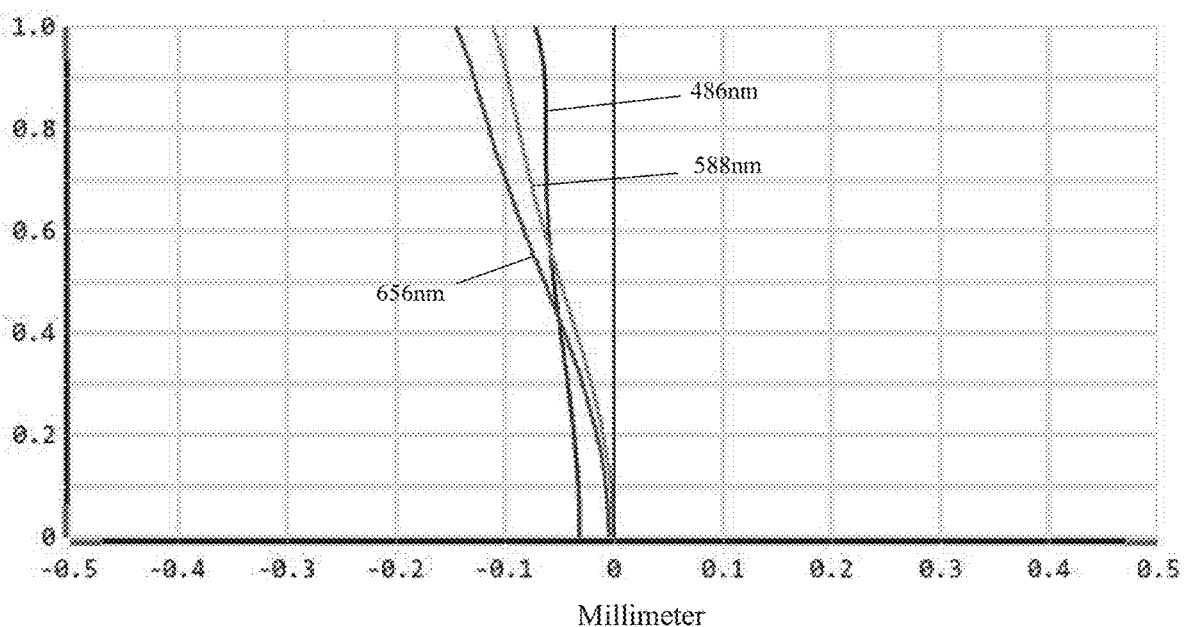
FIG. 6 is a schematic diagram showing the axial aberration of the microscope objective lens shown in FIG. 5.
Figure 7:
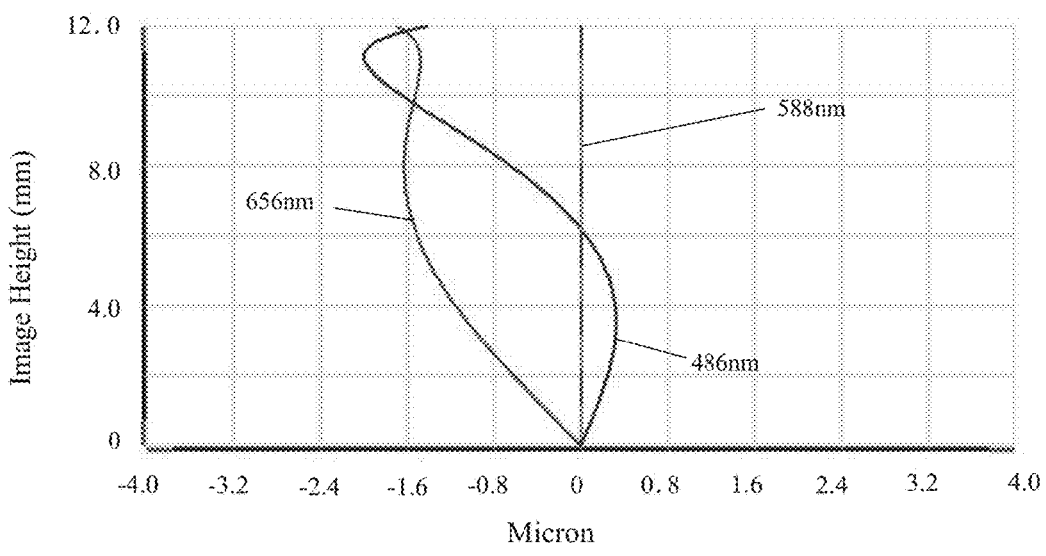
FIG. 7 is a schematic diagram showing the magnification chromatic aberration of the microscope objective lens shown in FIG. 5.
Figure 8:
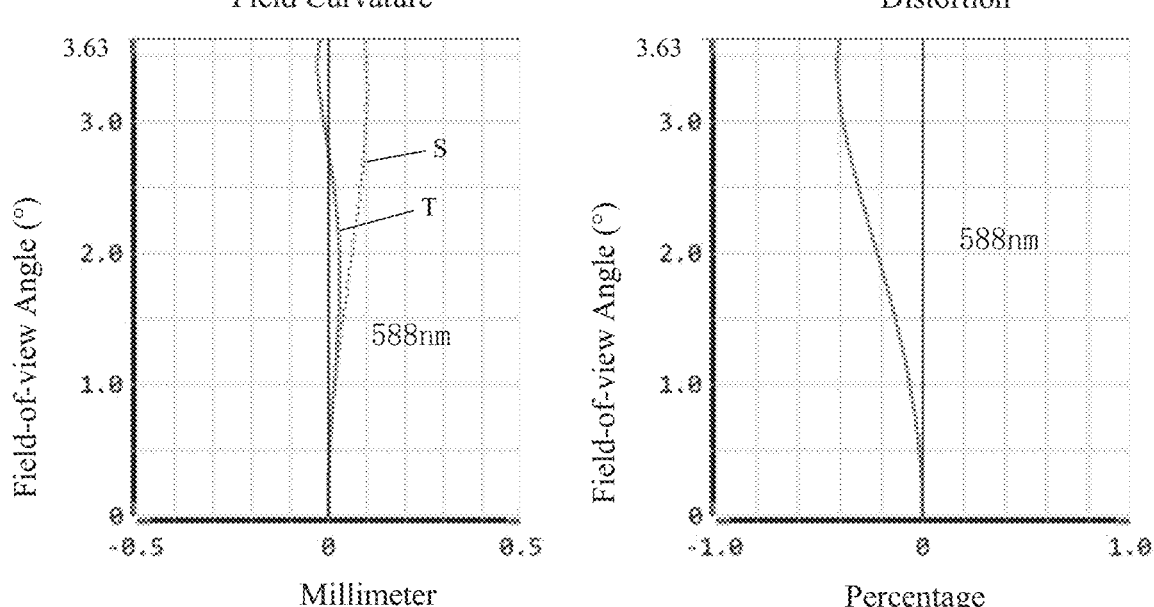
FIG. 8 is a schematic diagram showing the field curvature and distortion of the microscope objective lens shown in FIG. 5.

FIGS. 6 and 7 are schematic diagrams showing axial aberration and magnification chromatic aberration of light with wavelengths of 656 nm, 588 nm, and 486 nm, respectively, after passing through the microscope objective 20 of the second embodiment. FIG. 8 is a schematic diagram showing the field curvature and distortion of light with a wavelength of 588 nm after passing through the microscope objective 20 of the second embodiment. The field curvature S of FIG. 8 is the field curvature in the arc-sagittal direction, and T is the field curvature in the meridional direction.

convex at the proximal-axis position. The objective surface of the ninth lens L9 is concave at the proximal-axis position. The emitting surface of the tenth lens L10 is convex at the proximal-axis position.

Figure 9:
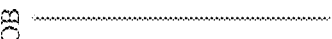
FIG. 9 is a structural schematic diagram of a microscope objective lens according to the third embodiment of the present application.
Figure 9:
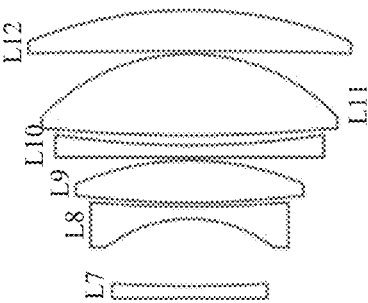
Figure 9:
Figure 9:
Figure 9:
Figure 9:
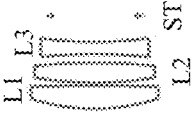

FIG. 9 is a structural schematic diagram of the microscope objective lens 30 according to the third embodiment of the present application.

Table 3 illustrates the design data of the microscope objective lens 30 of the third embodiment of the present application.

TABLE 3

| | | R | d IMA | INF | Refractive Index (nd) | | Abbe number (vd) |
|---|---|---|---|---|---|---|---|
| G1 | R1 | 18.132 | d1 | 2.190 | n1 | 1.5168 v1 | 64.199 |
| | R2 | −400.000 | d2 | 0.262 | | | |
| G2 | R3 | 25.904 | d3 | 1.880 | n2 | 1.5891 v2 | 61.254 |
| | R4 | −88.266 | d4 | 0.965 | | | |
| G3 | R5 | −54.987 | d5 | 1.015 | n3 | 1.8340 v3 | 37.211 |
| | R6 | 26.302 | d6 | 1.049 | | | |
| ST | | Infinity | dST-4 | 17.464 | | | |
| G4 | R7 | −37.903 | d7 | 1.166 | n4 | 1.8040 v4 | 46.574 |
| | R8 | 26.687 | d8 | 0.867 | | | |
| G5 | R9 | 37.518 | d9 | 2.661 | n5 | 1.6201 v5 | 36.431 |
| | R10 | −9.631 | d10 | 0.533 | | | |
| G6 | R11 | −9.040 | d11 | 1.000 | n6 | 1.8160 v6 | 46.549 |
| | R12 | −20.221 | d12 | 20.730 | | | |
| G7 | R13 | 37.898 | d13 | 1.188 | n7 | 1.8160 v7 | 46.549 |
| | R14 | 18.221 | d14 | 12.168 | | | |
| G8 | R15 | −22.542 | d15 | 1.057 | n8 | 1.8160 v8 | 46.549 |
| | R16 | 300.598 | d16 | 3.096 | | | |
| G9 | R17 | 22.230 | d17 | 1.444 | n9 | 1.4378 v9 | 94.523 |
| | R18 | 26.593 | d18 | 1.751 | | | |
| G10 | R19 | 45.138 | d19 | 1.017 | n10 | 1.9538 v10 | 32.309 |
| | R20 | 28.773 | d20 | 1.656 | | | |
| G11 | R21 | 45.982 | d21 | 6.409 | n11 | 1.5174 v11 | 52.149 |
| | R22 | −22.863 | d22 | 0.304 | | | |
| G12 | R23 | −97.256 | d23 | 2.865 | n12 | 1.6201 v12 | 36.431 |
| | R24 | −33.202 | d24 | 21.000 | | | |

Figure 10:
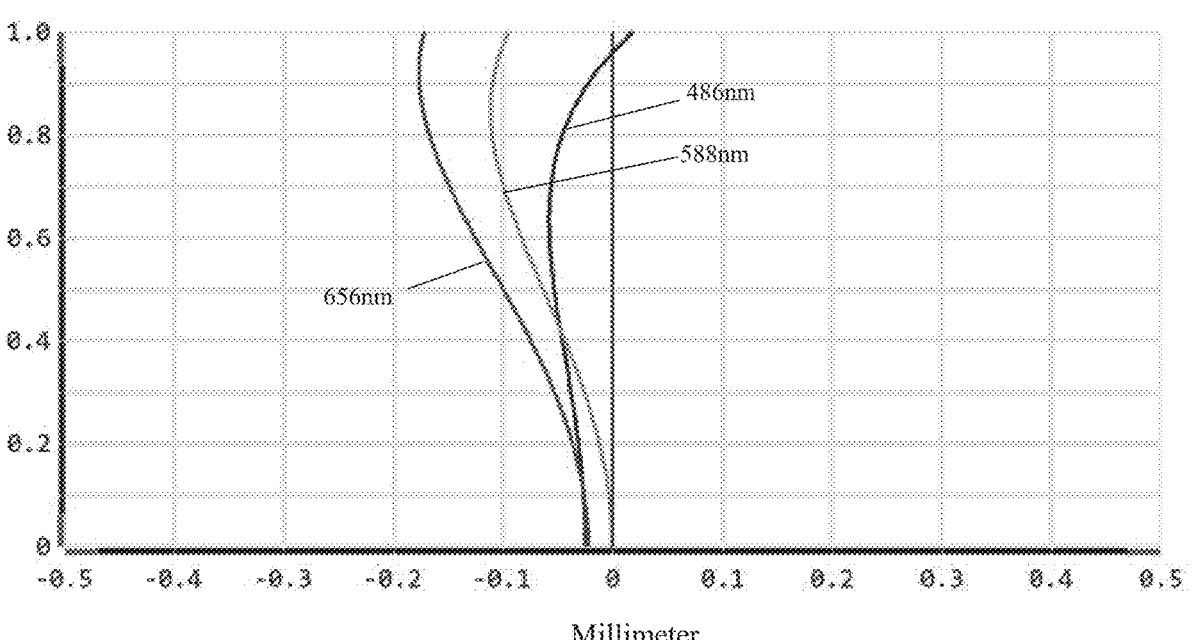
FIG. 10 is a schematic diagram showing the axial aberration of the microscope objective lens shown in FIG. 9.
Figure 11:
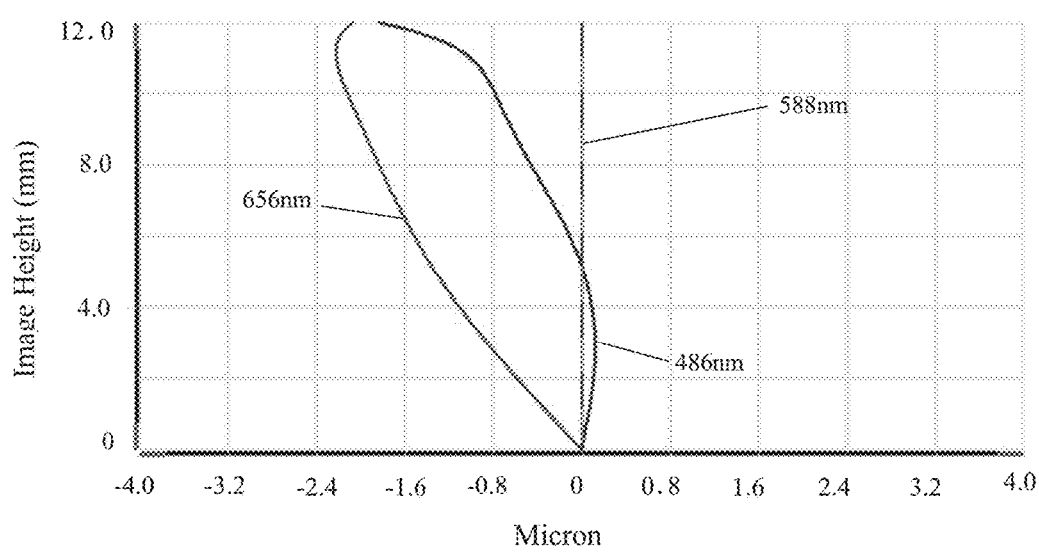
FIG. 11 is a schematic diagram showing the magnification chromatic aberration of the microscope objective lens shown in FIG. 9.
Figure 12:
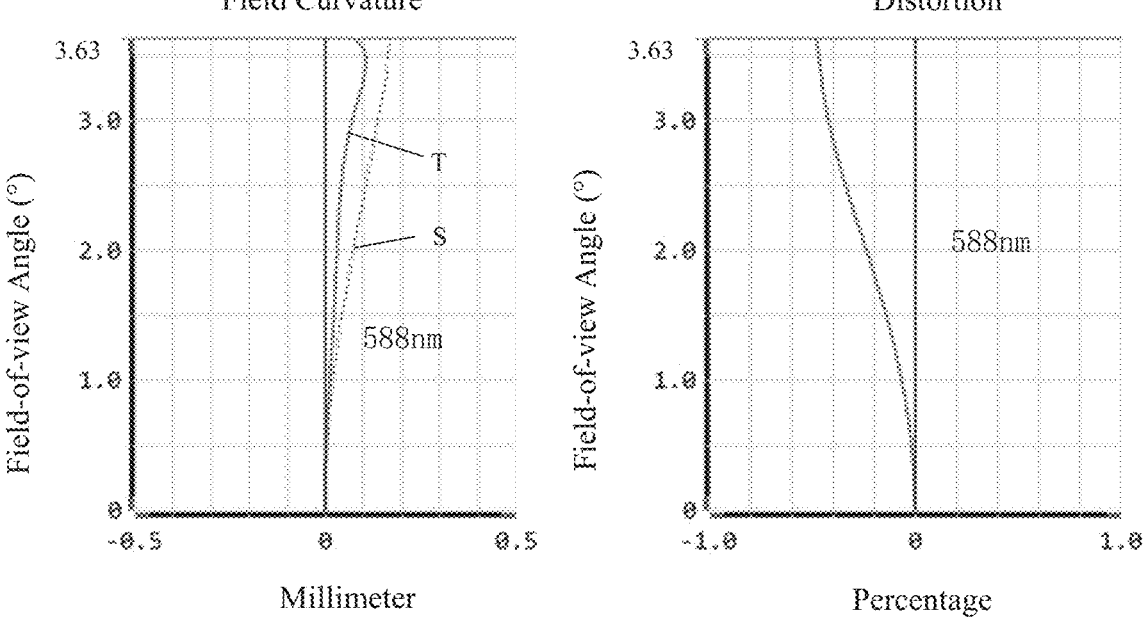
FIG. 12 is a schematic diagram showing the field curvature and distortion of the microscope objective lens shown in FIG. 9.

FIGS. 10 and 11 are schematic diagrams showing axial aberration and magnification chromatic aberration of light with wavelengths of 656 nm, 588 nm, and 486 nm, respectively, after passing through the microscope objective lens 30 of the third embodiment. FIG. 12 is a schematic diagram showing the field curvature and distortion of light with a wavelength of 588 nm after passing through the microscope objective lens 30 of the third embodiment. The field curvature S of FIG. 12 is the field curvature in the arc-sagittal direction, and T is the field curvature in the meridional direction.

Table 4 in the following lists the values corresponding to each of the relationship expressions in the present embodiment in accordance with the above relationship expressions. It is clear that the microscope objective 40 in this embodiment satisfies the above-described relationship expressions.

In this embodiment, an ENPD of the microscope objective 40 is 11.033 mm, a full field-of-view image height (IH) is 12.000 mm, a numerical aperture (NA) is 0.028 mm, and a field-of-view angle (FOV) in the diagonal direction is 7.26°. The microscope objective 40 satisfies the design requirements of low aberrations and has excellent optical characteristics due to its on-axis and off-axis chromatic aberrations being sufficiently compensated.

TABLE 4

| Parameters and relationship expressions | First Embodiment | Second Embodiment | Third Embodiment |
|---|---|---|---|
| f1 − 4/f | 0.09 | 0.12 | 0.15 |
| f78/( d13 + d14 + d15) | −1.34 | −1.15 | −0.97 |
| R21/R22 | −6.97 | −4.50 | −2.01 |
| NA*f/WD | 0.20 | 0.23 | 0.26 |
| f | 190.108 | 190.000 | 189.998 |
| f1 | 30.432 | 29.621 | 33.623 |
| f2 | 37.807 | 36.486 | 34.202 |
| f3 | −21.110 | −21.489 | −21.212 |
| f4 | −26.786 | −15.424 | −19.323 |
| f5 | 10.037 | 10.598 | 12.633 |
| f6 | −10.239 | −18.236 | −20.876 |

TABLE 4-continued

| Parameters and relationship expressions | First Embodiment | Second Embodiment | Third Embodiment |
|---|---|---|---|
| f7 | −98.601 | −40.492 | −44.206 |
| f8 | −11.920 | −18.097 | −25.660 |
| f9 | 39.825 | 82.323 | 281.134 |
| f10 | −83.249 | −66.514 | −85.812 |
| f11 | 28.999 | 28.174 | 30.480 |
| f78 | −10.12 | −11.19 | −13.93 |
| f9 − 12 | 17.49 | 22.92 | 27.73 |
| TTL | 102.186 | 102.039 | 105.739 |
| IH | 12.000 | 12.000 | 12.000 |
| NA | 0.022 | 0.025 | 0.028 |
| FOV | 7.26° | 7.26° | 7.26° |
| Magnification | 1.0 | 1.0 | 1.0 |

It can be understood by those of ordinary skill in the art that each of the above embodiments is a specific embodiment for realizing the present application, and that various changes can be made thereto in form and detail in practical application without departing from the spirit and scope of the present application.

What is claimed is:

1. A microscope objective lens, comprising in order from an emitting side to an objective side:

a first lens having a positive refractive force;

a second lens having a positive refractive force;

a third lens having a negative refractive force;

a fourth lens having a negative refractive force;

a fifth lens having a positive refractive force;

a sixth lens having a negative refractive force;

a seventh lens having a negative refractive force;

an eighth lens having a negative refractive force;

a ninth lens having a positive refractive force;

a tenth lens having a negative refractive force;

an eleventh lens having a positive refractive force; and a twelfth lens having a positive refractive force;

wherein a focal length of the microscope objective lens is f; a focal length of a lens group consisting of the ninth lens, the tenth lens, the eleventh lens, and the twelfth lens is f9-12; a combined focal length of the seventh lens and the eighth lens is f78; an on-axis thickness of the seventh lens is d13; an on-axis thickness of the eighth lens is d15; an on-axis distance from an objective surface of the seventh lens to an emitting surface of the eighth lens is d14; a central radius of curvature of an emitting surface of the eleventh lens is R21; a central radius of curvature of an objective surface of the eleventh lens is R22; a numerical aperture of the microscope objective lens is NA; a working distance of the microscope objective lens is WD, and the following relationship expressions are satisfied:

$$0.09 \leq f9 - 12/f \leq 0.15;$$

$$-1.35 \leq f78/(d13 + d14 + d15) \leq -0.95;$$

$$-7.00 \leq R21/R22 \leq -2.00;$$

$$0.20 \leq NA * f/WD \leq 026.$$

2. The microscope objective lens of claim 1, wherein a central radius of curvature of an emitting surface of the fifth lens is R9; a focal length of the fifth lens is f5, and the following relationship expression is satisfied:

$$0.90 \leq R9/f5 \leq 3.00.$$

3. The microscope objective lens of claim 1, wherein an emitting surface of the first lens is convex at a proximal-axis position, and an objective surface of the first lens is convex at a proximal-axis position;
a focal length of the first lens is f1; a central radius of curvature of the emitting surface of the first lens is R1; a central radius of curvature of the objective surface of the first lens is R2; an on-axis thickness of the first lens is d1; an optical total length of the microscope objective lens is TTL, and the following relationship expressions are satisfied:

$$0.08 \leq f1/f \leq 0.27$$

$$-1.83 \leq (R1 + R2)/(R1 - R2) \leq -0.56;$$

$$0.01 \leq d1/TTL \leq 0.03.$$

4. The microscope objective lens of claim 1, wherein an emitting surface of the second lens is convex at a proximal-axis position, and an objective surface of the second lens is convex at a proximal-axis position;
a focal length of the second lens is f2; a central radius of curvature of the emitting surface of the second lens is R3; a central radius of curvature of the objective surface of the second lens is R4; an on-axis thickness of the second lens is d3; an optical total length of the microscope objective lens is TTL, and the following relationship expressions are satisfied:

$$0.09 \leq f2/f \leq 0.30;$$

$$-1.09 \leq (R3 + R4)/(R3 - R4) \leq -0.02;$$

$$0.01 \leq d3/TTL \leq 0.03.$$

5. The microscope objective lens of claim 1, wherein an emitting surface of the third lens is concave at a proximal-axis position, and an objective surface of the third lens is concave at a proximal-axis position;
a focal length of the third lens is f3; a central radius of curvature of the emitting surface of the third lens is R5; a central radius of curvature of the objective surface of the third lens is R6; an on-axis thickness of the third lens is d5; an optical total length of the microscope objective lens is TTL, and the following relationship expressions are satisfied:

$$-0.23 \leq f3/f \leq -0.07;$$

$$-0.26 \leq (R5 + R6)/(R5 - R6) \leq 0.53;$$

$$0.00 < d5/TTL \leq 0.01.$$

6. The microscope objective lens of claim 1, wherein an objective surface of the fourth lens is concave at a proximal-axis position;
a focal length of the fourth lens is f4; a central radius of curvature of an emitting surface of the fourth lens is R7; a central radius of curvature of the objective surface of the fourth lens is R8; an on-axis thickness of the third lens is d7; an optical total length of the microscope objective lens is TTL, and the following relationship expressions are satisfied:

$$-0.28 \leq f4/f \leq -0.05;$$

$$0.09 \leq (R7 + R8)/(R7 - R8) \leq 4.94;$$

$$0.00 < d7/TTL \leq 0.02.$$

7. The microscope objective lens of claim 1, wherein an emitting surface of the fifth lens is convex at a proximal-axis position, and an objective surface of the fifth lens is convex at a proximal-axis position;
a focal length of the fifth lens is f5; a central radius of curvature of the emitting surface of the fifth lens is R9; a central radius of curvature of the objective surface of the fifth lens is R10; an on-axis thickness of the fifth lens is d9; an optical total length of the microscope objective lens is TTL, and the following relationship expressions are satisfied:

$$0.03 \leq f5/f \leq 0.10;$$

$$-0.65 \leq (R9 + R10)/(R9 - R10) \leq 0.89;$$

$$0.01 \leq d9/TTL \leq 0.04.$$

8. The microscope objective lens of claim 1, wherein an emitting surface of the sixth lens is concave at a proximal-axis position;
a focal length of the sixth lens is f6; a central radius of curvature of the emitting surface of the sixth lens is R11; a central radius of curvature of an objective surface of the sixth lens is R12; an on-axis thickness of the sixth lens is d11; an optical total length of the microscope objective is TTL, and the following relationship expressions are satisfied:

$$-0.22 \le f6/f \le -0.04;$$

$$-5.23 \le (R11 + R12)/(R11 - R12) \le -0.13;$$

$$0.00 < d11/TTL \le 0.01.$$

9. The microscope objective lens of claim 1, wherein the objective surface of the seventh lens is concave at a proximal-axis position;

a focal length of the seventh lens is f7; a central radius of curvature of an emitting surface of the seventh lens is R13; a central radius of curvature of the objective surface of the seventh lens is R14; an on-axis thickness of the seventh lens is d13; an optical total length of the microscope objective lens is TTL, and the following relationship expressions are satisfied:

$$-1.04 \le f7/f \le -0.14;$$

$$0.38 \le (R13 + R14)/(R13 - R14) \le 6.21;$$

$$0.00 < d13/TTL \le 0.02.$$

10. The microscope objective lens of claim 1, wherein the emitting surface of the eighth lens is concave at a proximal-axis position, and an objective surface of the eighth lens is concave at a proximal-axis position;

a focal length of the eighth lens is f8; a central radius of curvature of the emitting surface of the eighth lens is R15; a central radius of curvature of the objective surface of the eighth lens is R16; an on-axis thickness of the eighth lens is d15; an optical total length of the microscope objective lens is TTL, and the following relationship expressions are satisfied:

$$-0.27 \le f8/f \le -0.04;$$

$$-1.72 \le (R15 + R16)/(R15 - R16) \le -0.52;$$

$$0.00 < d15/TTL \le 0.01.$$

11. The microscope objective lens of claim 1, wherein an emitting surface of the ninth lens is convex at a proximal-axis position;

a focal length of the ninth lens is f9; a central radius of curvature of the emitting surface of the ninth lens is R17; a central radius of curvature of an objective surface of the ninth lens is R18; an on-axis thickness of the ninth lens is d17; an optical total length of the microscope objective lens is TTL, and the following relationship expressions are satisfied:

$$0.10 \le f9/f \le 2.22;$$

$$-22.38 \le (R17 + R18)/(R17 - R18) \le 0.75;$$

$$0.01 \le d17/TTL \le 0.05.$$

12. The microscope objective lens of claim 1, wherein an objective surface of the tenth lens is concave at a proximal-axis position;

a focal length of the tenth lens is f10; a central radius of curvature of an emitting surface of the tenth lens is R19; a central radius of curvature of the objective surface of the tenth lens is R20; an on-axis thickness of the tenth lens is d19; an optical total length of the microscope objective lens is TTL, and the following relationship expressions are satisfied:

$$-0.90 \le f10/f \le -0.23;$$

$$0.50 \le (R19 + R20)/(R19 - R20) \le 6.77;$$

$$0.00 < d19/TTL \le 0.01.$$

13. The microscope objective lens of claim 1, wherein the emitting surface of the eleventh lens is convex at a proximal-axis position, and the objective surface of the eleventh lens is convex at a proximal-axis position;

a focal length of the eleventh lens is f11; a central radius of curvature of the emitting surface of the eleventh lens is R21; a central radius of curvature of the objective surface of the eleventh lens is R22; an on-axis thickness of the eleventh lens is d21; an optical total length of the microscope objective lens is TTL, and the following relationship expressions are satisfied:

$$0.07 \le f11/f \le 0.24;$$

$$0.17 \le (R21 + R22)/(R21 - R22) \le 1.12;$$

$$0.03 \le d21/TTL \le 0.10.$$

14. The microscope objective lens of claim 1, wherein an emitting surface of the twelfth lens is concave at a proximal-axis position, and an objective surface of the twelfth lens is convex at a proximal-axis position;

a focal length of the twelfth lens is f12; a central radius of curvature of the emitting surface of the twelfth lens is R23; a central radius of curvature of the objective surface of the twelfth lens is R24, and the following relationship expressions are satisfied:

$$0.16 \le f12/f \le 0.63;$$

$$0.59 \le (R23 + R24)/(R23 - R24) \le 3.06;$$

$$0.01 \le d23/TTL \le 0.05.$$

15. The microscope objective lens of claim 1, wherein the first lens, the second lens, the third lens, the fourth lens, the fifth lens, the sixth lens, the seventh lens, the eighth lens, the ninth lens, the tenth lens, the eleventh lens, and the twelfth lens are all made of glass materials.

\* \* \* \* \*